(12) United States Patent
Carteaux et al.

(10) Patent No.: US 12,711,345 B2
(45) **Date of Patent: *Aug. 18, 2026**

(54) TEXTILE PART PROVIDED WITH AN ELECTRONIC TAG COMPRISING A WIRED ELECTRONIC DEVICE AND METHOD FOR PRODUCING SUCH A PART

(71) Applicant: Primo1D, Grenoble (FR)

(72) Inventors: Nicolas Carteaux, Ventron (FR); Anne Guirimand, Sassenage (FR); Daniele Sette, Grenoble (FR)

(73) Assignee: Primo1D, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,801

(22) Filed: Apr. 25, 2025

(65) Prior Publication Data

US 2025/0265440 A1 Aug. 21, 2025

Related U.S. Application Data

(63) Continuation of application No. 17/600,366, filed as application No. PCT/FR2020/051984 on Nov. 3, 2020, now Pat. No. 12,327,153.

(30) Foreign Application Priority Data

Nov. 8, 2019 (FR) ...................................... 1912590
Mar. 23, 2020 (FR) ...................................... 2002785

(51) Int. Cl.
*G06K 19/06* (2006.01)
*G06K 19/077* (2006.01)
(Continued)

(52) U.S. Cl.
CPC ......... *G06K 19/07773* (2013.01); *H01Q 7/00* (2013.01); *H01Q 1/2208* (2013.01)

(58) Field of Classification Search
CPC .... D04B 1/102; D04B 1/12; G06K 19/07758; G06K 19/027; G06K 19/07718;
(Continued)

(56) References Cited

U.S. PATENT DOCUMENTS 2,653,559 A 9/1953 Picucci
4,157,692 A 6/1979 Brocklehurst
(Continued)

FOREIGN PATENT DOCUMENTS

DE 4218141 A1 12/1992
DE 29622334 U1 4/1997
(Continued)

OTHER PUBLICATIONS

European Search Report and Written Opinion for Application No. 24153846.1 dated May 16, 2024, 21 pages.
(Continued)

*Primary Examiner* — Daniel St Cyr
(74) *Attorney, Agent, or Firm* — TraskBritt

(57) ABSTRACT

A method for making a textile part, comprising a step of forming a stitched seam. The stitched seam step also aims to secure an electronic tag to the textile part. The electronic tag is formed from a strip comprising a wired electronic device comprising a chip associated with at least one antenna wire, the chip and the antenna wire being arranged inside the stitched seam. The invention also relates to the textile part provided with the tag.

12 Claims, 3 Drawing Sheets

(51) Int. Cl.
*H01Q 7/00* (2006.01)
*H01Q 1/22* (2006.01)

(58) Field of Classification Search
CPC ......... G06K 19/0723; G06K 19/07773; G06K 19/041; H01Q 7/00; H01Q 1/12
USPC .................................................. 235/492, 487
See application file for complete search history.

(56) References Cited

U.S. PATENT DOCUMENTS

| | | | |
|---|---|---|---|
| 4,635,574 A | 1/1987 | Fujita et al. | |
| 4,901,661 A | 2/1990 | Sturm et al. | |
| 5,161,474 A | 11/1992 | Ishikawa et al. | |
| 5,375,545 A | 12/1994 | Adamski et al. | |
| 5,390,614 A | 2/1995 | Adamski et al. | |
| 5,460,109 A | 10/1995 | Adamski et al. | |
| 6,329,917 B1 | 12/2001 | Leonard | |
| 8,212,676 B2 | 7/2012 | Cullen et al. | |
| 8,782,880 B2 | 7/2014 | Vicard et al. | |
| 10,783,424 B1 | 9/2020 | Trivelpiece et al. | |
| 2006/0065739 A1 | 3/2006 | Falls et al. | |
| 2009/0272814 A1* | 11/2009 | Granhed .............. | G06K 19/067 235/492 |
| 2010/0035027 A1 | 2/2010 | Hill | |
| 2010/0313806 A1 | 12/2010 | Koenig et al. | |
| 2011/0114734 A1 | 5/2011 | Tiedmann et al. | |
| 2011/0147462 A1 | 6/2011 | Speich | |
| 2011/0303751 A1 | 12/2011 | Lai et al. | |
| 2013/0092742 A1 | 4/2013 | Brun et al. | |
| 2014/0152507 A1 | 6/2014 | McAllister | |
| 2015/0024589 A1 | 1/2015 | Brun | |
| 2016/0302526 A1 | 10/2016 | Meir | |
| 2016/0321528 A1 | 11/2016 | Elbaz et al. | |
| 2017/0103632 A1 | 4/2017 | Tolle | |
| 2018/0125158 A1 | 5/2018 | Adami et al. | |
| 2020/0193261 A1 | 6/2020 | De Backer | |
| 2022/0318532 A1 | 10/2022 | Roth | |
| 2023/0084051 A1 | 3/2023 | De Backer | |
| 2023/0097855 A1 | 3/2023 | Carteaux et al. | |

FOREIGN PATENT DOCUMENTS

| | | | |
|---|---|---|---|
| DE | 202017106813 | U1 | 2/2018 |
| EP | 1390926 | B1 | 4/2007 |
| EP | 2362960 | B1 | 3/2014 |
| EP | 2502188 | B1 | 5/2016 |
| EP | 2810299 | B1 | 7/2016 |
| EP | 2772873 | B1 | 12/2019 |
| EP | 2585628 | B1 | 3/2021 |
| FR | 1305451 | A | 10/1962 |
| FR | 3036823 | B1 | 10/2018 |
| FR | 3103043 | A1 | 5/2021 |
| GB | 0517080 | | 1/1940 |
| GB | 2472025 | A | 1/2011 |
| GB | 2472026 | A | 1/2011 |
| JP | 4272201 | B2 | 6/2009 |
| JP | 2013-142950 | A | 7/2013 |
| JP | 2015-129989 | A | 7/2015 |
| WO | 2008/080245 | A2 | 7/2008 |
| WO | 2009/136837 | A1 | 11/2009 |
| WO | 2011/161336 | A1 | 12/2011 |
| WO | 2016/038342 | A1 | 3/2016 |
| WO | 2017/135331 | A1 | 8/2017 |
| WO | 2018/138437 | A1 | 8/2018 |
| WO | 2018/193198 | A1 | 10/2018 |
| WO | 2019/170952 | A1 | 9/2019 |
| WO | 2019/175509 | A1 | 9/2019 |
| WO | 2021/249805 | A1 | 12/2021 |
| WO | 2021/089939 | A1 | 5/2023 |

OTHER PUBLICATIONS

French Preliminary Search Report for French Application No. 1912590 dated Apr. 21, 2020, 2 pages.

French Preliminary Search Report for French Application No. 2002785 dated Jun. 15, 2020, 2 pages.

French Search Report for Application No. FR2109205 dated Feb. 1, 2022, 2 pages.

International Search Report for International Application No. PCT/FR2020/051984 dated Feb. 9, 2021, 2 pages.

International Written Opinion for International Application No. PCT/FR2020/051984 dated Feb. 9, 2021, 7 pages.

Japanese Notice of Rejection for Application No. 2022-525972 dated Nov. 15, 2024, 10 pages with machine translation.

Sette, Daniele, E-Thread™ Embed RFID Yarn into Products to Boost Asset Digitalization, IDTECH conference, Nov. 20-21, 2019. 20 pages.

Sette, Daniele, Video Presentation, Embed Primo1D's RFID Yarn in Products to Boost Assets' Digitalization « presentation dated Nov. 20, 2019 disclosed at the IDTECH conference, (Nov. 20-21, 2019), Santa Clara Convention Center, CA, USA, https://www.idtechex.com/usa2019/show/en/speakers/13830/e-thread-embed-primo1ds-rfid-yarn-in-products-to-boost-assets-digitalization, DVD submitted, relevant passage is from 10:32 to 11:55.

Sette, Daniele, Video Presentation, Embed Primo1D's RFID Yarn in Products to Boost Assets' Digitalization « presentation dated Nov. 20, 2019 disclosed at the IDTECH conference, (Nov. 20-N21, 2019), Santa Clara Convention Center, CA, USA, https://www.idtechex.com/usa2019/show/en/speakers/13830/e-thread-embed-primo1ds-rfid-yarn-in-products-to-boost-assets-digitalization, CD-R submitted, relevant passage is from 10:32 to 11 :55.

* cited by examiner

TEXTILE PART PROVIDED WITH AN ELECTRONIC TAG COMPRISING A WIRED ELECTRONIC DEVICE AND METHOD FOR PRODUCING SUCH A PART

CROSS-REFERENCE TO RELATED APPLICATIONS

This application is a continuation of U.S. patent application Ser. No. 17/600,366, filed May 6, 2022, which is a national phase entry under 35 U.S.C. § 371 of International Patent Application PCT/FR 2020/051984, filed Nov. 3, 2020, designating the United States of America and published as International Patent Publication WO 2021/089939 A1 on May 14, 2021, which claims the benefit under Article 8 of the Patent Cooperation Treaty to French Patent Application Serial No. FR 1912590, filed Nov. 8, 2019, and to French Patent Application Serial No. FR 2002785, filed Mar. 23, 2020, the disclosure of each of which is hereby incorporated herein in its entirety by this reference.

TECHNICAL FIELD

The present disclosure relates to the field of electronic identification tagging of textile parts, such as clothing.

BACKGROUND

The tags used in this field are often designated by the name "RFID tag" (the initials of the expression "Radio-Frequency IDentification"). Such tags comprise an electronic identification chip having radiofrequency transmission-reception functions coupled to an antenna.

According to a first conventional approach, the antenna is formed by conductive tracks arranged on a plastic or paper support. The chip is assembled by bonding to the support so as to place its connection pads, respectively, in contact with the conductive tracks forming the antenna. The support, generally, has a rectangular shape, the length and width of which have dimensions of several centimeters so as to be able to accommodate the necessary dimensions of the antenna and to facilitate handling of the tag.

The functional assembly comprising the chip and its support is generally referred to by the term "inlay" in the relevant literature. Such inlays, generally, are manufactured collectively on a backing strip and are available in the form of a roll.

In order to form an electronic identification tag from an inlay, this inlay is generally packaged in a protective case, for example, made of plastic, as is documented in U.S. Pat. No. 8,212,676. The dimensions of the tag thus formed are relatively large in the aforementioned document: a height of 5 mm, a length of 150 mm and a width of 22 mm.

To facilitate the integration of identification functions in textile products, attempts have been made to give a wire form factor to an electronic tag. Thus, documents U.S. Pat. No. 6,329,917, WO2016038342, WO2011161336, GB 2472025, GB 2472026, U S20110147462, WO2008080245 or WO 2019175509 are known, which incorporate textile yarns, spaced apart in their lengths, as well as antennas and electronic chips.

"Textile yarn" or more simply "yarn," refers to elements that can be woven or incorporated into a textile product. They therefore have a tensile strength, a flexibility and a form factor that are conventional in the weaving field in order to be handled by conventional equipment available in the clothing industry. Such textile yarns incorporating antennas and RFID electronic chips can be integrated into textile products during the manufacture thereof or secured to these products after they are manufactured.

By way of example, provision can be made to use an RFID textile yarn as a weft or warp yarn at the selvage of a fabric, which may be of very large size. By arranging the RFID devices spaced at regular intervals along the RFID yarn forming the weft or warp yarn of the fabric, it is possible to automatically identify lengths of fabric, for example, in the winding direction of this fabric on a cylindrical support.

Document WO 2009136837 thus proposes to place a transponder in the seam of a textile part. The transponder is formed by a diode connected to two conductive wire portions forming an antenna, and by a wired transmission line between these wires, in parallel to the diode. The transponder is encapsulated in a dielectric material. The handling of the transponder proposed by this document is difficult with the traditional equipment in the clothing sector. It is not secured to the textile part, and it can slip, in particular, in the seam. Sewing the transponder to the textile part is not easy, because the risk of pricking this transponder, and of rendering it non-functional, when making this seam, is high.

Document FR 3036823 provides for attaching a tag incorporating an RFID module on a textile part using the "electric" antenna wire of this module. The antenna is sewn onto the tag; it extends on either side of this tag: it is therefore not integrated into the tag. The RFID module of this document is bulky because in such a module, a chip is connected to a magnetic antenna, generally formed by conductive tracks arranged in a loop on a substrate for holding the chip. Integrating this module into a seam requires several tailoring operations, including sewing the "electric" antenna wire, which makes its integration into the seam unsuitable for a volume deployment of this solution.

The present disclosure aims to provide an electronic identification tag that differs from this state of the art. It also aims to provide a textile product that ingeniously incorporates this electronic identification tag.

BRIEF SUMMARY

With a view to achieving at least part of one of these aims, the present disclosure provides a method for making a textile part, comprising a step of forming a stitched seam, the method being characterized in that the stitched seam step also aims to secure an electronic tag to the textile part, the electronic tag being formed from a strip comprising a wired electronic device comprising a chip electrically connected to at least one antenna wire, the chip and the antenna wire being arranged inside the stitched seam.

According to other advantageous and non-limiting features of the present disclosure, taken alone or in any technically feasible combination:

- the stitched seam is a seam chosen from the list comprising: a single-thread blind stitch, overcasting stitches, satin or zigzag stitches, overlock stitches, cover stitches, straight stitches;
- the stitched seam comprises overlock stitches and wherein the chip and the antenna wire are arranged under loops of the overlock stitches;
- the electronic tag is sewn to the textile part by at least part of the stitched seam;
- the chip is an electronic identification chip having radiofrequency transmission-reception functions;

- the wired electronic device includes the chip and at least one antenna wire, the chip having at least one pad to which the at least one antenna wire is electrically connected; and
- the antenna wire is arranged along and parallel to an edge of the tag.

According to another aspect, the present disclosure provides a textile part provided with an electronic tag formed from a strip comprising a wired electronic device comprising a chip associated with at least one antenna wire, the electronic tag being retained by way of a stitched seam, the chip and the antenna wire being arranged inside the stitched seam.

According to other advantageous and non-limiting characteristics of this aspect of the present disclosure, taken alone or in any technically feasible combination:

- the stitched seam comprises overlock stitches, and the chip and the antenna wire are arranged under loops of the overlock stitches;
- the electronic tag is sewn to the textile part by at least part of the stitched seam;
- the stitched seam runs along one edge of the textile part;
- the chip is an electronic identification chip having radiofrequency transmission-reception functions;
- the wired electronic device includes the chip and at least one antenna wire, the chip having at least one pad to which the at least one antenna wire is electrically connected;
- the chip and the antenna wire are covered by at least one textile covering yarn and/or by coating with a protective material; and
- the antenna wire is arranged along and parallel to an edge of the tag.

BRIEF DESCRIPTION OF THE DRAWINGS

Other features and advantages of the present disclosure will become apparent from the detailed description of example embodiments of the present disclosure that follows with reference to the accompanying figures, in which.

DETAILED DESCRIPTION

Figure 1A:
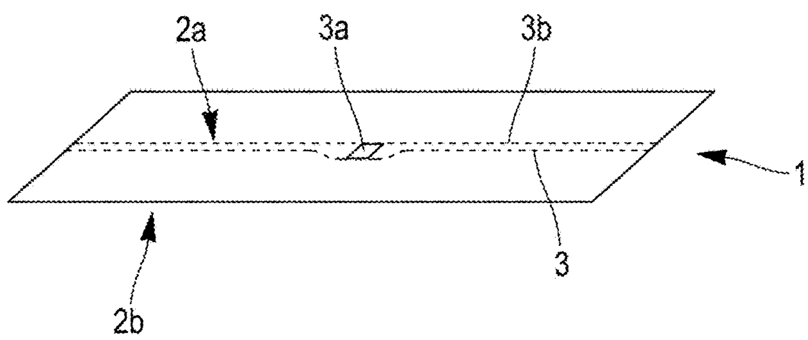
FIGS. 1A, 1B and 2 show embodiments of an electronic tag according to the present disclosure.
Figure 1B:
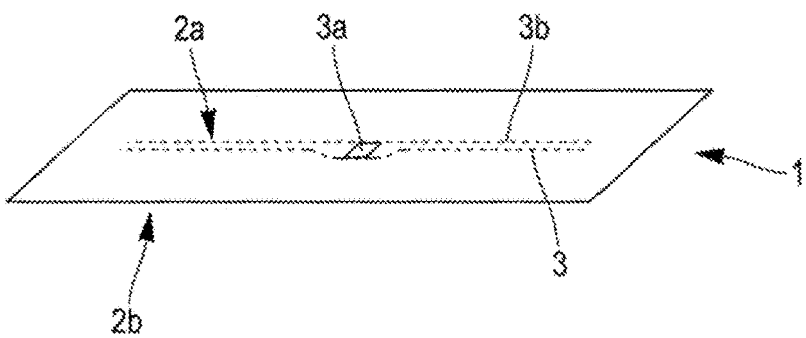

With reference to FIGS. 1A and 1B, an electronic identification tag 1 is described that forms a first aspect of the present description. The tag 1 has a rectangular (and more generally, trapezoidal) shape, with a length of several centimeters, typically between 3 cm and 20 cm. The corners of the tag 1 may have a rounded shape. The length of the tag 1 is sufficient to accommodate an antenna wire 3*b* of an RFID device 3, as will be made apparent in the remainder of this description. Advantageously, this antenna wire 3*b* extends in a rectilinear manner in the length of the tag. It can extend from one end of the tag to the other, as shown in FIG. 1A or approach these ends without joining them, as shown in FIG. 1B. The antenna wire 3*b* can also be arranged along a diagonal of the tag, which makes it possible to make it more compact. Provision can also be made for the antenna wire not to be perfectly straight, but to have at least one curvature in the plane of the tag, so as to be able to accommodate any elastic deformation of the tag. The width of the tag 1, generally, is smaller than its length, typically less than a centimeter, and typically between 2 mm and 8 mm. It has a thickness that may be between 0.1 mm to 2 mm.

The tag 1 of the examples of FIGS. 1A and 1B includes two portions of textile strip 2*a*, 2*b* that are assembled and sealed to one another by their main faces. A segment of an RFID yarn 3 is sandwiched between these two faces, the segment comprising an electronic chip 3*a* and the antenna wire 3*b*. The strip portions, and therefore the tag, have sufficient flexibility so as not to modify the flexibility of the textile part in which they are intended to be integrated. Similarly, they can have an elasticity making it possible to conform to the elasticity of this textile part. They can thus have an elongation capacity of between 0% (and in this case be integrated into jeans or into a thick canvas of a work suit, that is to say, textile parts made up of fabrics that are not likely to elongate) and 100% (and be able to be integrated into textile parts composed of elastic fibers), and, preferably, of the order of 5 to 20% (to integrate into textile parts in classic knits like T-shirts, etc.).

For this reason of integration into a textile part, the use of textile strips to constitute the tag 1 forms its preferred embodiment; however, this is not the only possible embodiment. The strip portions 2*a*, 2*b* can thus consist of, or comprise, a wide variety of materials, chosen according to the sealing technique used or according to the nature of the textile part into which the tag is intended to be integrated.

By way of example, and when the two strip portions are sealed by soldering, at least one of the portions comprises a material that is fusible at a moderate temperature, for example, less than 400° C., and, generally, between 100° C. and 400° C. This temperature must be higher than the temperatures of the treatments that the tag is likely to undergo during its use, and lower than a temperature that would lead to the chip 3*a* being exposed to an excessive temperature (typically of the order of 200° C.). Such a fusible material may correspond to a thermoplastic material usually used in the field of clothing (such as polyamide, the melting point of which is around 250° C., or polyester, the melting point of which is around 200° C. to 250° C.). It can also correspond to a plastic material.

It is not necessary for all the surfaces of the strip portions 2*a*, 2*b* to be sealed together: the tag can thus only have weld lines or points located, for example, near the edges forming its length and, possibly, the edges forming the width. When the weld points or lines are thus peripheral and therefore relatively far from the electronic chip 3*a*, welding the strips together can locally and briefly expose the strips to a temperature exceeding their melting temperature, but without the electronic chip 3*a* itself being exposed to a temperature above about 200° C.

When the sealing is facilitated by applying an adhesive layer on at least one of the strip portions, or by means of a seam, the nature of the strips from which the portions 2*a*, 2*b* are extracted can be chosen more freely.

At least one of these strip portions 2*a*, 2*b* can also be formed from a laminate having one layer of fusible material and another layer of non-fusible material, such as cotton. The non-fusible layer then forms at least one of the exposed surfaces of the tag 1, which makes it possible to give it an external appearance and a texture allowing it to be easily integrated into a textile part.

In all cases, the RFID yarn segment 3 of the tag 1 comprises at least one electronic identification chip 3*a* having radiofrequency transmission-reception functions and electrically assembled to at least one conductive wire 3*b* forming the "electric" transmit-receive antenna. In the remainder of this description, "wired electronic identification device" will refer to the chip 3*a* electrically assembled to at least one antenna 3*b* (at least one conductive wire or at least one conductive track) comprised in a segment of RFID yarn, and "RFID yarn" will refer to an element having a wired form factor and comprising, arranged in its length, a plurality of wired electronic identification devices.

As stated in the introduction of this disclosure, such a segment of RFID yarn 3 can be produced in multiple ways.

It may be, in particular, an RFID yarn as described in the introduction to this disclosure. In such a yarn, the wired electronic identification devices, generally, are covered by at least one textile covering yarn, for example, by wrapping the covering yarn. It is also possible to provide a core yarn along which the wired electronic identification devices are arranged collinearly or in a spiral. In addition to or as a replacement for the covering yarn and/or the core yarn, provision may be made to coat the wired electronic identification devices with an encapsulating material, which may be a plastic formed by extrusion.

Documents EP2585628 and WO2019175509 (the disclosures of which are incorporated herein in their entireties by this reference in the present description) disclose various preferred embodiments of RFID yarns that are compatible with the present description, but that do not form the only possible embodiments. These documents, in particular, provide an embodiment according to which it is possible to incorporate wired electronic identification devices into a textile yarn, at evenly spaced and selected intervals. In the RFID yarns described by these documents, collectively referred to as "wrapped," the antenna conductive wires of the wired electronic identification device are arranged collinearly or in a spiral around a core yarn, which may have an elastic characteristic. When the antenna wire is arranged in a spiral, the antenna wire has a high elongation capacity that makes the incorporation of segments of this RFID yarn particularly suitable for elastic textile parts.

Protecting wired electronic identification devices using a covering textile yarn and/or by coating with a protective material has the advantage of protecting the conductive wire forming an antenna. In particular, this conductive wire does not pass through the strip portions 2*a*, 2*b* between which it is sandwiched, in particular, when these portions 2*a*, 2*b* are made of textile material. Such a phenomenon can be caused when the tag 1 in which a segment of the RFID yarn is integrated is secured to a textile part that is liable to wrinkle, for example, during washing thereof.

It should be noted that the RFID yarn segment 3 incorporated in the tag 1 is not necessarily in the form of the "wrapped" textile yarn that has just been presented, even if this embodiment is preferred.

Thus, the RFID yarn can comprise a simple chain of wired electronic identification devices, that is to say, of a plurality of electronic identification chips linked together by at least one conductive wire forming the antenna (and, preferably, two conductive wires). Such a chain does indeed constitute an RFID yarn within the meaning of the present description. Additional details on possible characteristics of such a chain will be found in documents U.S. Pat. No. 8,782,880, EP2810299 or WO2018193198 (the disclosures of which are incorporated herein in their entireties by this reference in the present disclosure). Provision can be made to protect the chain, or part of it, by wrapping it with a covering yarn, or by coating or extruding it with a protective material, such as a resin. A segment of such a chain therefore includes an electronic chip 3*a* on the pads of which the conductive wires forming the antenna have been electrically assembled (by soldering, for example), the whole of which may possibly be incorporated, at least in part, in a protective material. Such a segment may be perfectly suitable for being integrated sandwiched between two strips, and for forming a tag 1 according to the present description.

It is also conceivable for the RFID yarn to comprise chips assembled on a wired strip, on which elongated and conductive tracks forming the antenna are arranged. These tracks can be formed by depositing a thin layer of aluminum, as is well known per se. The chips are assembled, for example, by bonding, to the wired strip in order to bring their connection pads into contact with the conductive tracks, and thus to form a plurality of functional wired electronic identification devices. The wired strip can be made of plastic, paper, or fabric. The conductive tracks can also be formed by one or more conductive wires(s), sewn or embroidered in the strip, whether the latter is formed from a fabric, plastic or paper. It is also conceivable for the tracks to be printed on the strip. The term "wired strip" means that the strip has a flat surface, the width of which must be compatible with the wired form factor of the electronic identification devices in accordance with the present description, and have a width of less than 1 mm or 2 mm. The length of the wired strip, when a portion has been cut to isolate a wired electronic identification device, is dictated by the necessary antenna length, and is typically between 3 and 20 cm.

To manufacture an RFID yarn strip, the conductive tracks forming the antenna are formed on a substrate of very large dimensions (for example, 1 to 2 m wide, for example, 1.4 m, and which may be several tens of meters long) along rows in the length of the substrate; then the RFID electronic chips are assembled on this substrate in order to bring their connection pads into contact with the conductive tracks or with the sewn conductive wires. After this step, the strip substrate can be cut along the rows, and thus form the RFID yarn in strip form of this embodiment, which can be spooled.

It should be noted that, in addition to the transmission-reception and identification functions, the electronic chip 3*a* of a tag 1 can also be configured to present functions other than those of identification, such as measurement functions (of temperature, humidity, pressure) or even luminescence functions.

On the tag 1 shown in FIG. 1, the RFID yarn segment 3 comprises a single chip 3*a*. Provision could be made to integrate several electronic chips between the strip portions 2*a*, 2*b*, each chip possibly having identical identification functions (for reliability reasons) or distinct functions (for example, one chip having an identification function and the other having a unique measuring function). An example of such a configuration is presented, for example, in document EP3319168. It would also be possible to provide for placing several yarn segments 3, for example, parallel to each other, between the two strip portions 2*a*, 2*b*.

Advantageously, the RFID yarn segment 3 is arranged along and parallel to an edge of the tag, along its length in the case of the example shown. It can be centered over its width as shown in FIG. 1A and FIG. 1B. There are thus, on the tag and on each side of the RFID yarn segment, "inert" surfaces that can make it possible to attach the tag 1 to a textile product without affecting the operation of the RFID textile yarn, as will be detailed in the remainder of this description.

The exposed surfaces of the tag 1, that is to say, the main surfaces of the strip portions 2*a*, 2*b* that are not joined together, can serve as a printing surface to receive, for example, a visual identification code (bar code, QR code) and/or any other textual information that one wishes to associate with the textile product on which the tag is intended to be affixed.

Figure 2:
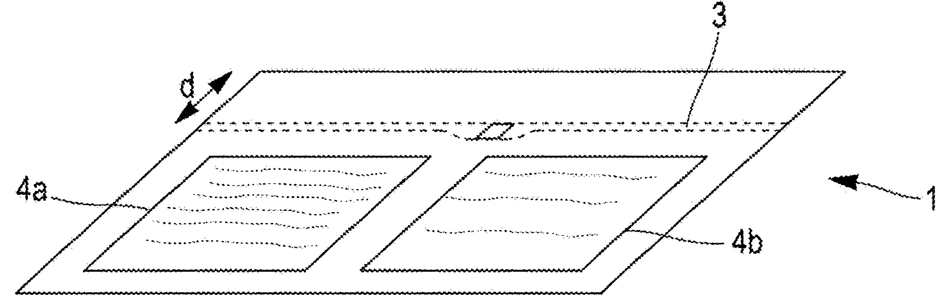

To this end, it is possible, as shown in FIG. 2, to provide an electronic tag that has an extended shape so as to be able to place this visual code 4*a* and/or this textual message 4*b* on at least one of the exposed surfaces. In this case, it may be advantageous not to place the RFID yarn centered on the width of the tag, but along and near one of its sides.

In all cases, one will choose to preserve a minimum distance d between the RFID yarn segment and an edge of the tag that makes it possible to define an inert strip of material wide enough to place stitches allowing the tag to be secured on a textile part. This minimum distance d can be 1 to 4 mm.

Figure 3:
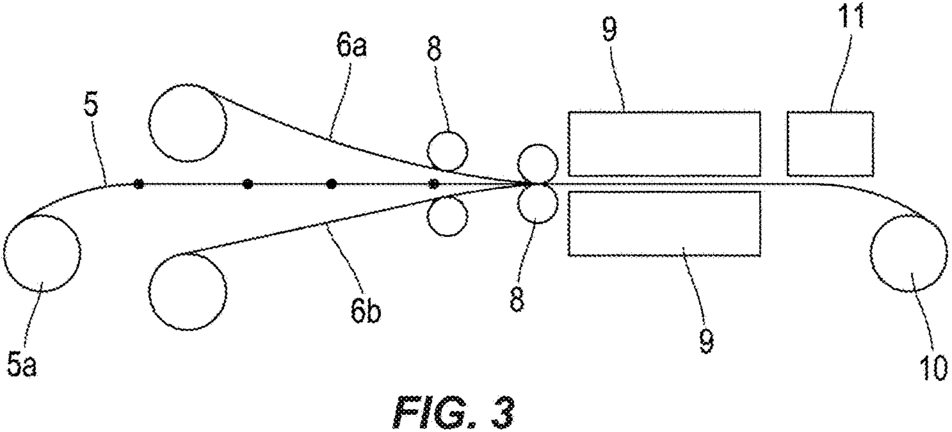
FIG. 3 schematically shows a method of producing an electronic tag according to the present disclosure, as well as equipment making it possible to implement this method.

The electronic tag 1 can be produced in large quantities and at high speeds, in a very simple manner. With reference to FIG. 3, a method for manufacturing the tag 1 comprises a step of supplying a very long RFID yarn 5, which therefore comprises a large number of wired electronic identification devices. The RFID yarn can be in the form of a spool 5*a*, and the supply step can involve unwinding this spool. Each electronic identification device is symbolized by a dot designating the electronic chip 3*a* in FIG. 3. As has already been mentioned, the long RFID yarn 5 can correspond to a wrapped RFID yarn, or to a chain of electronic identification devices, or else be in its "strip" form.

In the manufacturing method of FIG. 3, the RFID yarn 5 that unwinds from its spool 5*a* is guided to be positioned between two strips 6*a*, 6*b*. These strips can also be supplied in the form of spools. A plurality of guide rollers or pressers 8 and guide parts can be provided to guide and synchronously drive the movement of the strips 6*a*, 6*b* and of the RFID yarn 5.

During this movement, and at an area where the RFID yarn 5 is sandwiched between the two strips 6*a*, 6*b*, the two strips 6*a*, 6*b* are sealed to one another in order to form a functionalized strip (i.e., a continuous strip on and along which wired identification devices are arranged).

As has already been explained in detail in a previous passage, the respective nature of the strips 6*a*, 6*b* is linked to the sealing technique employed, which can be quite varied. It is possible, for example, to have provided at least one of the contact surfaces of the strips 6*a*, 6*b* with an adhesive material. In this case, the presser rollers can make it possible to promote the adhesion of the surfaces.

Alternatively, and as shown in FIG. 3, a sealing station 9 can be provided, allowing the two surfaces to be sealed in contact with the strips. This equipment may contain heating elements combined with pressurizing the surfaces to promote sealing, for example, by heat sealing. It is understood that the temperature and the pressure must be moderate so as not to damage the RFID textile yarn 5, and, in particular, the electronic chip that it contains.

According to a particularly advantageous variant embodiment, this sealing is carried out by cold welding, by ultrasound, for example, by means of one or a plurality of sonotrode(s) arranged in the sealing station 9.

It is also possible to envisage sealing the strips 6*a*, 6*b* by means of a seam or a plurality of seams.

In the case of sealing by welding, it is advantageously possible to form welding spots or lines on the edges of the strips, far enough from the RFID yarn so as not to damage it by excessive heating, as has already been explained in a previous passage. It is also possible to envisage placing welding spots or lines at cutting zones of the functionalized strip so that the strip portions 2*a*, 2*b* of each tag 1 extracted from the functionalized strip are well sealed over their entire periphery. Advantageously, at least one such welding spot or line will be formed at the antenna wire in the cutting zone in order to keep the latter between the two strip portions. This advantage can also be obtained when the sealing is carried out by sewing, by providing a seam at least partially covering the cutout areas.

In the case of sealing by welding, whether thermal or ultrasonic, the nature of at least one strip will be chosen so that it comprises a material that is fusible at a moderate temperature, below 400° C., so that when the temperature of the strip is raised above this temperature, locally and briefly, the electronic chip 3*a* is not exposed to an excessive temperature that could damage it.

It is possible, of course, to combine sealing by welding and/or sealing by applying an adhesive material and/or sealing by sewing.

As has already been said, the strip can be a laminated strip. This lamination step can be carried out during the manufacturing method shown in FIG. 3. In this case, it is possible, for example, to provide for placing a sealing strip, which unwinds from a dedicated spool (not shown in FIG. 3), between the two main strips before they are sealed. The sealing strip may, depending on the sealing technique chosen, have two faces provided with a layer of adhesive material or be made from a fusible material.

Other stations can be provided in the equipment for manufacturing the functionalized strip, such as a printing station 11 and/or a station for cutting or precutting the strip into tags. When not cut into tags, the functionalized strip can be collected on a spool of strip 10.

In a variant of this embodiment, the RFID yarn is not continuously unwound from a spool in order to be inserted continuously between the two strips 6*a*, 6*b*. On the contrary, a station is provided for cutting the RFID yarn, directly downstream of its packaging spool, so as to take functional segments of this yarn (that is to say, segments, respectively, comprising wired electronic identification devices). The segments taken are inserted one by one between the two strips 6*a*, 6*b*, which can move continuously. For this purpose, provision can be made for a segment taken from the RFID yarn cutting station to be transported via a pipe, possibly assisted by a jet of compressed air injected into this pipe, in an insertion area where it can be caught by the movement of the strips 6*a*, 6*b* so as to be sandwiched between these two strips.

This embodiment is advantageous because it allows a segment of RFID yarn to be inserted between the two strips 6*a*, 6*b* in a perfectly controlled manner. In particular, a sufficient distance can be left between two segments to allow the sealing and cutting of the two strips. In a tag 1 produced by this method, shown in FIG. 1B, the antenna wire 3*b* of the wired electronic identification device 3 does not extend from one end of the tag 1 to the other in the direction of the length, and this antenna does not open onto or is not flush with the sides of the tag. The two strips 6*a*, 6*b* can be perfectly sealed together over the entire periphery of the tag 1 in order to perfectly encapsulate the device 3.

When the RFID yarn that one seeks to integrate between two strips takes the form of an RFID yarn strip, it is possible to seek to integrate the manufacturing steps of the RFID yarn strip into those of the tag. As stated previously, such RFID yarn strips are formed, generally, in rows on large substrates, before being cut into strips. Provision can be made to integrate into this manufacturing method, and before cutting the substrate into a strip, an assembly step aimed at placing the substrate bearing the electronic identification devices (or a portion thereof) between two widths made from the same materials as those already described for the strip portions 2*a*, 2*b*. In this case, it will be preferable to provide an assembly of the two widths by way of an adhesive material, but in the case where this assembly is carried out by welding, one will seek to form the welding spots so as to define areas surrounding the electronic identification devices at least in part, and thus to predefine the tags 1. Once this assembly has been completed, it can be cut into a strip.

Alternatively, provision can be made to position the sealing step after the step for cutting the assembly formed by the two widths and the substrate into strips. The sealing step and the steps subsequent to this sealing are then in this case very similar to those described in relation to FIG. 3.

In a variant of this embodiment, a single width is used and assembled on the face of the substrate bearing the electronic identification devices, the other width then being replaced in this variant by the substrate itself.

It should be noted that this manufacturing method leading to placing the wired identification devices between two widths can also be implemented for any form of RFID yarn. In this case, extended sections of the RFID yarn are arranged in parallel rows on one of the large widths, which are then covered with a second width. The assembly can then be cut into a strip, along the parallel rows of yarns.

In yet another embodiment, a plurality of electronic tags is formed by weaving an RFID yarn in a textile strip. In such a case, the functionalized strip comprises an RFID yarn woven into the textile strip. After the strip is cut, the electronic identification tag incorporates at least one wired electronic device woven into a portion of the strip. The RFID yarn, which can be of the wrapped type, can be pulled, for example, between the warp yarns of the textile strip during its manufacture. Conversely, it can be integrated after this strip is manufactured.

Very generally, the method of manufacturing the electronic tag 1 therefore comprises the following two steps:

- arranging at least one wired electronic device (which can be incorporated into an RFID yarn or a segment of RFID yarn) between two parts (which can be strips, or widths, or a width and the substrate of electronic chips); and
- sealing the two parts together to define at least one electronic tag. This sealing can take place before the widths assembled to the chip substrate are cut into strips, or after this cutting. It can be implemented by welding, by means of an adhesive material, by sewing, etc.

Independent of the manufacturing technique chosen, at the end of the manufacturing method, a functionalized strip is available, that is to say, a strip (band of flexible material, for example, a narrow, long and flat fabric) in which an entire length of an RFID yarn is integrated or in which segments of an RFID yarn are integrated, spaced apart from one another. The RFID yarn can be of any type, for example, wrapped, or in a strip, or can even be composed of a simple chain of wired electronic identification devices.

In order to obtain an electronic tag according to the present description, segments of the functionalized strip are removed, for example, by tearing or cutting these segments at the cutting marks previously formed by the printing station 11 or by a precutting station. It is ensured, of course, that in each cut portion of the strip of an RFID textile yarn section comprises an intact and functional electronic identification device (chip and antenna).

In all cases, the strip functionalized according to the embodiments described in the present description and the tags 1 taken from this strip have form and rigidity factors that allow them to be handled very easily in order to integrate them into a product or into a textile part using conventional equipment in this industrial sector. In particular, a tag can be sewn onto the textile part, by running stitches in an inert zone of the tag, for example, running on one side and/or on the other side of the RFID textile yarn 3.

According to a particularly advantageous approach, and which moreover forms an aspect in itself of the present disclosure, at least one tag is secured to the textile part by means of a stitched seam, advantageously on one edge of this textile part. Such a stitched seam is a seam whose primary function is to treat the textile part so as to make it a finished product. The present disclosure provides for taking advantage of this stitched seam to integrate the tag therein, so that at least the wired electronic identification device is placed inside this seam. In this way, the electronic device is effectively protected with the sewing thread, and it can be integrated very easily.

The stitches constituting the seam can be quite varied in nature, as documented in ISO 4915. It can therefore be a single-thread blind stitch (class 103 according to ISO standard 4915), overcasting stitching, satin or zigzag stitching (class 304), cover stitching (class 406 or 407), overlock stitching (according to one of the stitches in class 500), straight stitching (class 301 or 2x301).

Without excluding other types of stitches, the seam allowing the tag 1 to be secured to the textile part is advantageously formed by overlock stitches, and the wired electronic identification device is placed in/under the loops of the overlock stitches. It should be recalled that in overlock stitches, threads loop around the edge of the textile part. These stitches form a step in making a textile part aimed at treating the edge of this part. It is typically implemented by a serger, which is textile-making equipment making it possible to simultaneously assemble, finish the edges and cut excess fabric. It allows pieces of fabric to be assembled by overcasting the edges of these pieces. Such equipment is provided with a plurality of needles supplied with a plurality of textile yarns (at least two, sometimes 5 or more) coming from spools that make it possible to simultaneously sew and overcast the textile part(s). It allows, in particular, the formation of hems. It is also equipped with a blade to cut excess fabric.

Figure 4:
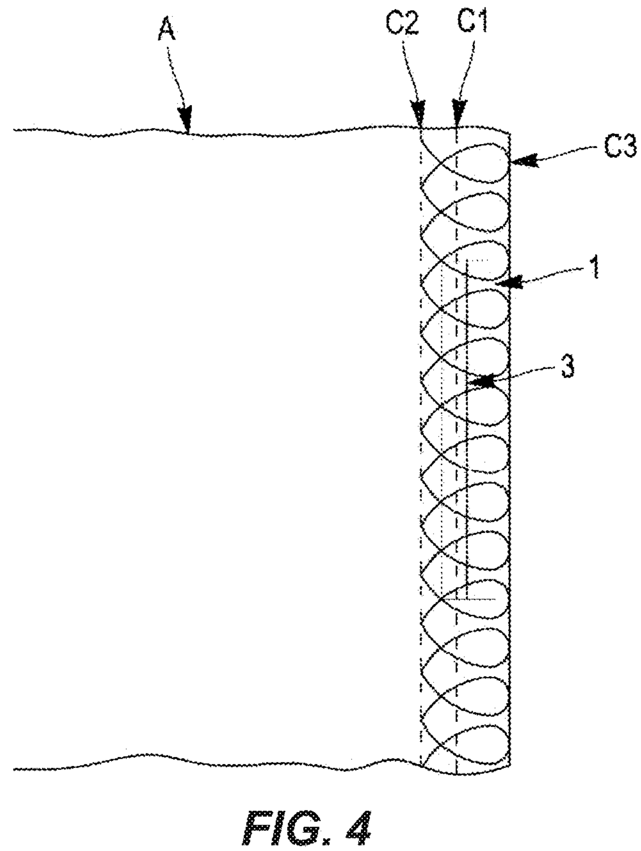
FIGS. 4, 5 and 6 show several embodiments of a textile part incorporating electronic tags according to the present disclosure.

FIG. 4 thus shows a textile part A to which an electronic identification tag 1 according to the present disclosure has been secured, by placing it entirely between the loops of the overlock.

It can be seen in this figure that the tag 1 can be retained in the textile part A on the one hand by means of a first straight seam c1, formed by a first needle of the serger, and substantially parallel to the RFID textile yarn. Furthermore, the tag 1 (and the RFID yarn segment contained in this tag) is held against the textile part by the loops c3 of the overlock formed by one or more other needles.

It is possible, of course, to provide other seams, formed by other needles, for example, a second seam c2 in FIG. 4 parallel to the first, all of these seams forming the overlock stitches.

To secure the tag 1 and to arrive at the textile part A shown in FIG. 4, it is possible to position the tag 1 by hand on the part beforehand and to slide the assembly under a sliding foot of the serging equipment. Advantageously, however, provision can be made for an additional tool in which an RFID tag is positioned and guided during the sewing operation to be integrated into this seam. It is also possible to provide automatic equipment on which the functionalized strip is mounted, for example, in the form of a spool. The equipment is then able to move the functionalized strip, cut it, and thus define a tag, and insert this tag so that it is introduced into the seam during the manufacture thereof.

Figure 5:
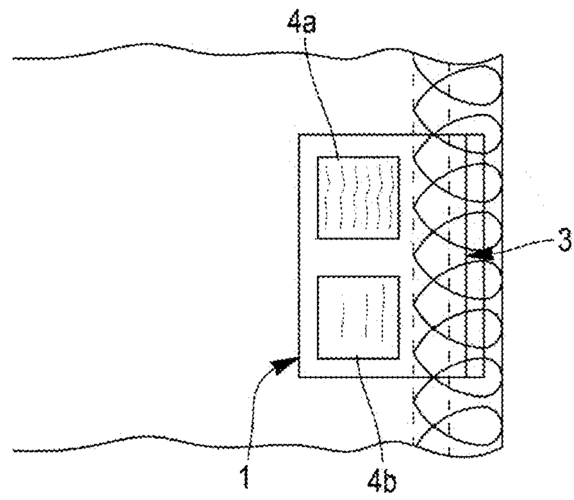

It is not necessary for the entire tag 1 to be placed between the overlock loops of the textile part. This is particularly true when this tag bears patterns 4_a_, 4_b_ (bar codes, textual instructions) that need to be made visible on at least one of these exposed surfaces. Thus, FIG. 5 shows a configuration in which only a part of the tag 1, and, in particular, the wired electronic identification device 3, is arranged between the loops of the overlock. This ensures good protection and good behavior of the RFID yarn segment.

Figure 6:
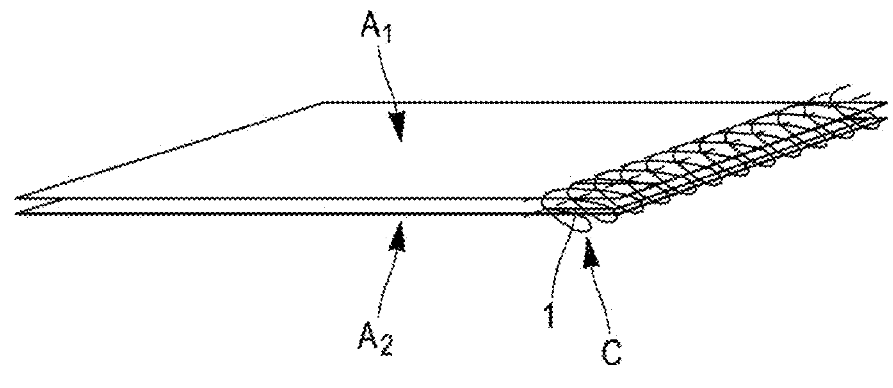

FIG. 6 shows another method of making a textile part, in which the tag 1 is placed between two elementary textile parts A1, A2 that are held together by the seam C. In this case as well, provision is made at a minimum to place the RFID yarn in loops of the overlock stitches, and possibly the entire tag 1. At least one straight seam allows the tag to be secured to the two elementary textile parts between which it is placed.

It will be noted that since the electronic identification device 3 is in wired form and is positioned precisely on the tag 1, it is easily possible to sew the tag 1 without damaging this device 3 (and, in particular, the antenna 3_b_), which is not always the case for prior art tags.

The tag 1 can be integrated in a repeatable, reliable and robust manner. It uses proven tailoring techniques, and does not generate excessive additional costs, since it is integrated into pre-existing tailoring steps.

Of course, the present disclosure is not limited to the embodiments described and it is possible to add variants without departing from the scope of the invention as defined by the claims.

As has already been mentioned, it is not essential for the electronic chip of the electronic device to comprise an electronic identification chip. M ore generally, it may be any type of electronic chip, for example, an electronic chip forming a sensor that can optionally incorporate transmission-reception functions connected to the antenna in order to be able to communicate these measurements. It may be, alternatively, an electronic chip having luminescence functions. From this point of view, and in general, the present disclosure therefore relates to an electronic tag comprising a wired electronic device integrated into a strip.

What is claimed is:

1. A system for securing an electronic tag including a textile strip comprising a chip associated with at least one electric antenna wire to a textile by a stitched seam formed of overlock stitches, the system comprising:

serging equipment for forming the stitched seam of overlock stitches; and a tool for positioning and guiding the electronic tag during the forming of the stitched seam of overlock stitches and integrating at least in part the electronic tag into the stitched seam of overlock stitches, wherein the chip and the at least one electric antenna wire are guided under loops of the overlock stitches while the electronic tag is sewn to the textile by at least part of the stitched seam.

2. The system of claim 1, further comprising automatic equipment for mounting a spool of a functionalized strip of electronic tags, the automatic equipment being configured to move the functionalized strip of electronic tags, to cut the functionalized strip to define at least one electronic tag, and to insert the at least one electronic tag within the stitched seam of overlock stitches.

3. The system of claim 1, wherein the electronic tag comprises a wired electronic device integrated into a strip, and wherein the system is configured to arrange the wired electronic device in loops of the overlock stitches.

4. The system of claim 3, wherein the loops of the overlock stitches are arranged around an edge of the textile.

5. The system of claim 3, wherein the wired electronic device comprises an electronic identification chip.

6. The system of claim 1, wherein the electronic tag is arranged entirely between loops of the overlock stitches.

7. The system of claim 1, wherein the textile comprises two elementary textile parts, and wherein the system is configured to arrange the electronic tag between the two elementary textile parts.

8. The system of claim 1, wherein the serging equipment also comprises at least one needle for forming at least one straight seam when forming the stitched seam of overlock stitches.

9. A method for attaching an electronic tag to a textile part by way of a stitched seam formed by overlock stitches, the electronic tag comprising a wired electronic device integrated into a ribbon, the wired electronic device comprising a chip associated with an antenna, the method comprising the following steps:

sewing the textile part using a serging equipment;

positioning the electronic tag in a guiding tool associated with the serging equipment; and guiding, during the textile sewing operation, the electronic tag through the guiding tool, so as to arrange the wired electronic device in loops of the overlock stitches.

10. The method according to claim 9 in which the textile part is formed of two elementary textile parts, the electronic tag being arranged between the two elementary textile parts.

11. The method according to claim 9 which the stitched seam operated using the serging equipment also comprises at least one straight seam.

12. The method according to claim 9 wherein the electronic tag is entirely disposed between loops of the overlock stitches.

* * * * *